United States Patent [19]

Prival et al.

[11] 3,988,657

[45] Oct. 26, 1976

[54] INDUCTIVE DEVICE FOR PRECISELY POSITIONING A MOVABLE MEMBER

[75] Inventors: Guy Prival, Chilly Mazarin; Jacques Michel Hennequin, Saint-Maurice; Yves-Jean Francois Brette, Sevres, all of France

[73] Assignee: Societe Industrielle Honeywell Bull, Paris, France

[22] Filed: Dec. 30, 1971

[21] Appl. No.: 215,967

[30] Foreign Application Priority Data
Dec. 31, 1970 France .............................. 70.47579

[52] U.S. Cl. ............................. 318/594; 318/603; 318/660
[51] Int. Cl.² ........................................ G05B 11/18
[58] Field of Search .................... 318/594, 603, 660

[56] References Cited
UNITED STATES PATENTS

| | | | |
|---|---|---|---|
| 2,947,929 | 8/1960 | Bower | 318/603 X |
| 3,105,963 | 10/1963 | Stevens et al. | 318/603 X |
| 3,117,263 | 1/1964 | MacDonald | 318/594 |
| 3,165,680 | 1/1965 | Morrison | 318/660 X |
| 3,512,060 | 5/1970 | Floyd | 318/603 |
| 3,673,584 | 6/1972 | Farrand | 318/660 UX |

Primary Examiner—B. Dobeck

[57] ABSTRACT

A device for precisely positioning a movable member along a rectilinear path, wherein a plane conductive winding is attached to and moves with said member, wherein sensors are spaced apart along said path opposite to said winding, and wherein a control circuit responds to the signals generated by said sensors for servoing the motor that drives said movable member.

5 Claims, 11 Drawing Figures

INDUCTIVE DEVICE FOR PRECISELY POSITIONING A MOVABLE MEMBER

BACKGROUND OF THE INVENTION

This invention relates to an inductive device for precisely positioning a movable member along a rectilinear path and, more particularly, to a device for precisely positioning a magnetic head relative to a magnetic disc in apparatus for the high density recording and reading of information.

Various means exist for furnishing the information necessary for the displacement and positioning of magnetic head transducers in disc memories. If the head-bearing carriage is driven by a rotating threaded shaft, the number of revolutions or fractions of revolutions completed by the shaft is measured by an arrangement, such as a disc, having openings disposed between a photo-detector and a light source. However, if a more flexible and reliable mode of propulsion is desired, with higher accelerations and velocities for the carriage on the one hand and a detection system having faster response times on the other hand, a ball bearing carriage is employed, for example. This carriage moves on rails and is driven either by a motor with a movable coil, by a linear motor, or by a linear hydraulic motor controlled by variable flow valves. In these instances, the detection devices utilized are inductive coupling devices and provide information as to the track of the magnetic disc on which the transducing heads are located. The more frequently utilized inductive coupling devices for this purpose are formed of two opposed flat conductors in the shape of rectangular-like windings. One of the two conductors is attached to the movable carriage and the other to the fixed portion of the chassis of the disc memory. One of these conductors plays the role of transmitter and the other the role of receiver, and the arrangement acts as a transformer. Such transformer has a coupling that varies according to the relative position of the transmitter and receiver between a maximum positive value when the crests of the windings oppose each other and a maximum negative value when the crests are opposite troughs.

If the transmitter is supplied with a relatively high frequency current, of the order of a few hundred of KHz, the receiver receives a voltage modulated in amplitude corresponding to the movement of the carriage. Each passage of the demodulated voltage through zero corresponds to a track.

However, such systems require relatively large currents, of the order of an ampere, in the transmitter, thereby posing problems of size and cooling of the conductor forming the winding. Moreover, since the signals received by the receiver are weak, chains of sufficiently strong amplification are required for the receiver as well as for the transmitter.

Accordingly, it is the object of the present invention to remedy these disadvantages of the prior art positioning devices.

Another object of the present invention is to provide an inductive device for precisely positioning a movable member along a rectilinear path, wherein said member may be, for example, a carriage bearing the writing and reading heads of a magnetic disc memory.

SUMMARY OF THE INVENTION

The device of the invention comprises a motor for driving a movable member along its path and a plane winding conductive circuit and comprising equispaced parallel conductive elements. The circuit is supplied from a source of high frequency voltage and is oriented parallel to the path of the movable member and attached thereto. Signal receiving heads are provided which have the air gaps thereof disposed along the conductive circuit, the distance between these air gaps measured in a direction parallel to the path of the movable member being a function of the distance between two adjacent elements. A control circuit receives the signals generated by the signal receiving heads and generates, in turn, a control signal for the driving motor.

The plane winding conductive circuit is fixed on a substrate that has a coefficient of thermal expansion identical to that of the magnetic disc. The number of pitches in the winding of the conductive circuit is equal to one-half the ratio of the number of separations between the recording tracks provided on the disc to the number of signal receiving heads.

The device of the invention further comprises a set of circuits for demodulating the signals generated by the signal receiving heads, the number of demodulation circuits being equal to the number of such heads. Means is provided for transforming each passage through zero of the output voltage of these demodulation circuits into logical pulses, wherein each such passage through zero corresponds to the passage of the reading and writing heads over a recording track. A track difference register represents the difference between the track intended to be reached and the track currently reached, this register being controlled by the aforementioned logical pulses. A track address register is also provided, as well as means controlled by such address register for delivering an analog error voltage providing for servoing the reading and writing heads in position over the selected recording track when the contents of the track difference register reaches zero.

BRIEF DESCRIPTION OF THE DRAWING

The invention will be described with reference to the accompanying drawing, wherein.

DESCRIPTION OF THE PREFERRED EMBODIMENT

Figure 1:
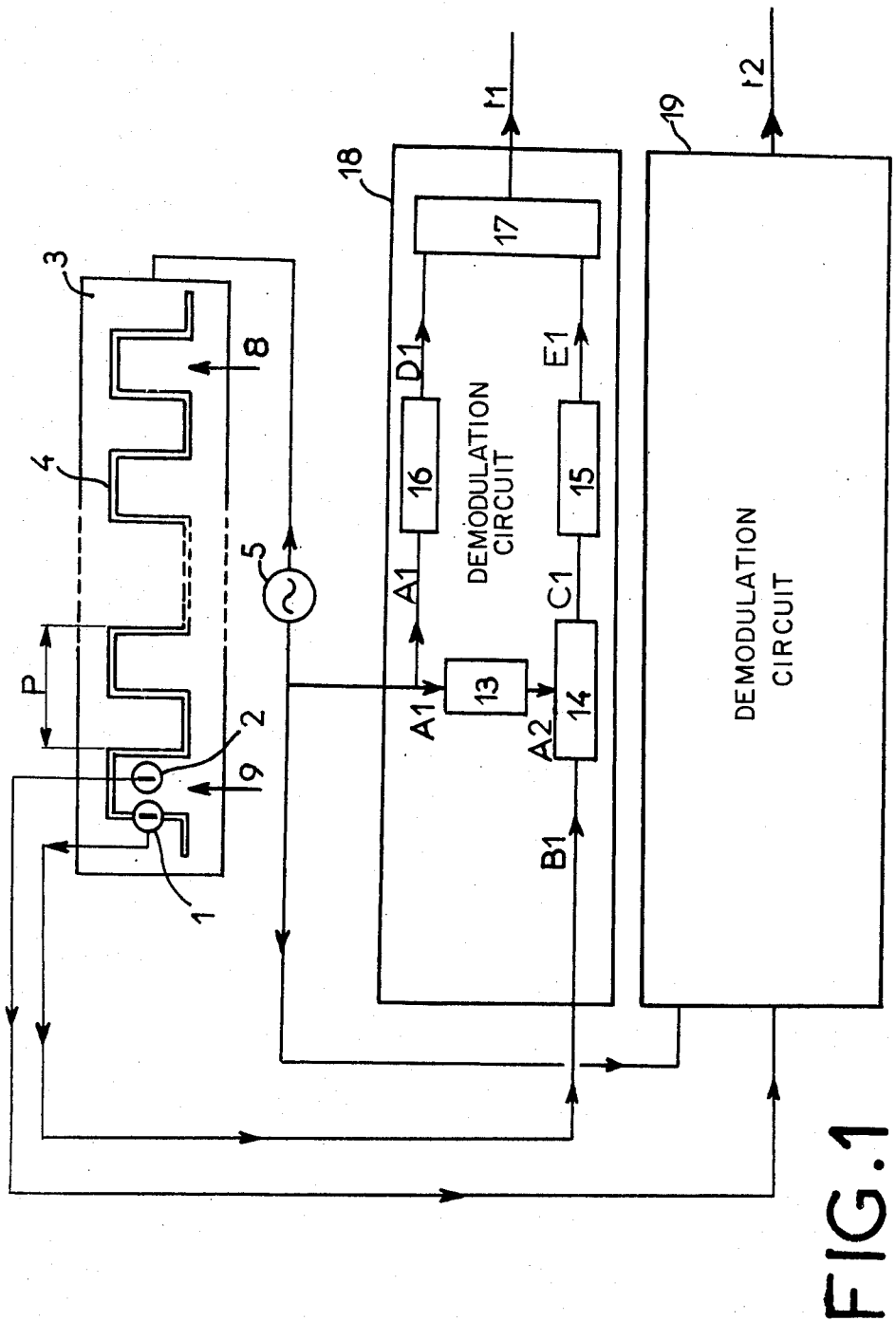
FIG. 1 is a schematic diagram illustrating the principle of the inductive device and demodulation circuits of the invention.

In accordance with the preferred embodiment the inductive device of the invention represented in FIG. 1 comprises a plane conductive circuit 4 forming windings or "hairpins", circuit 4 comprising, in turn, equispaced parallel elements. The inductive device further comprises high sensitivity signal receiving heads 1 and 2 of known type, the heads being magnetic transducers whose air gaps are disposed along conductive circuit 4. Circuit 4 is attached to a movable carriage, not shown, which bears the heads for reading and writing information on the magnetic discs and which describes a rectilinear path.

Figure 2:
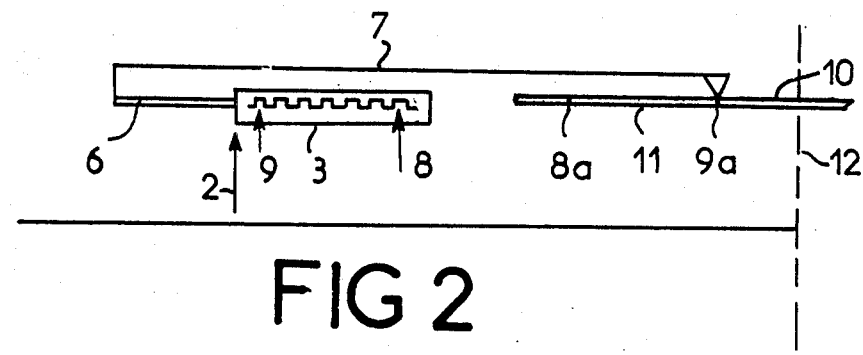
FIG. 2 is a schematic diagram of the arrangement for compensating for the thermal expansion of the magnetic disc.

Conductive circuit 4, hereinafter designated as the "transmitter" may be constituted of copper, for example, and be deposited by photoetching on a substrate strip 3. The plane of transmitter 4 is parallel to the path described by the carriage, the latter being moved by a motor element, not shown, which may be, for example, a motor with a movable coil, a linear motor, or a linear hydraulic motor. As shown in FIGS. 1 and 2, transmitter 4 consists of a predetermined number of pitches $p$ between the arrows 8 and 9. Arrows 8 and 9 correspond to the outside recording tracks 9a and 8a of the magnetic disc. The distance between arrows 8 and 9 is equal to the distance between tracks 9a and 8a. The number of pitches $p$ is equal to the ratio of the number of separations between the recording tracks on the disc to twice the number of signal receiving heads. In the exemplary embodiment described herein, the discs have 205 tracks and the inductive device has two signal receiving heads, so that the number of pitches in transmitter 4 is 51.

In order to reduce the consequences of variations in the dimensions of disc 10 due to thermal expansion, the following described means, shown schematically in FIG. 2, are utilized. The strip 3 supporting transmitter 4 has the same length and the same coefficient of thermal expansion as the useful part 11 of disc 10 between tracks 8a (1st track) and 9a (205th track). Further, strip 3 is connected to the head-bearing arm 7 by a member 6, which is fabricated so that it can compensate for the variations of dimensions due to the expansion of arm 7 and the part of disc 10 between the axis 12 thereof and track 9a.

The air gaps of heads 1 and 2 are situated in a plane parallel to transmitter 4, and are shown in FIG. 1 as a projection in a direction normal to the plane of transmitter 4. The distance between these air gaps measured along a direction parallel to the path described by the carriage is equal to one-half the distance separating two consecutive parallel elements of transmitter 4, which corresponds in the embodiment described herein to the distance separating two adjacent recording tracks on the magnetic discs.

The set of heads 1 and 2 will be hereinafter designated as the "receiver."

If a direct current flows through transmitter 4, the magnetic field created at a short distance from the transmitter will be a substantially sinusoidal function measured along a direction parallel to the path of the movable carriage. Therefore, when transmitter 4 is supplied with a high frequency alternating current furnished by a generator 5, FIG. 1, displaced relative to signal receiving heads 1 and 2, varying voltage signals $B_1$ and $B_2$ will be induced in the signal receiving heads. Signals $B_1$ and $B_2$ are modulated in amplitude and have the form represented in FIG. 4a, wherein the carrier frequency corresponds to that of the alternating voltage produced by generator 5. This carrier frequency, of the order of 1 MHz, is selected both to obtain a good signal/noise ratio at the output terminals of the receiver and to assure sufficiently precise definition of the modulation of signals $B_1$ and $B_2$, regardless of the velocity of displacement of the carriage. Furthermore, the joint use of the sensitive receiving heads and of the selected frequency enables obtaining sufficiently high modulated voltages with a small transmitter current, such a current producing only a negligible heating of transmitter 4.

Figure 3A:
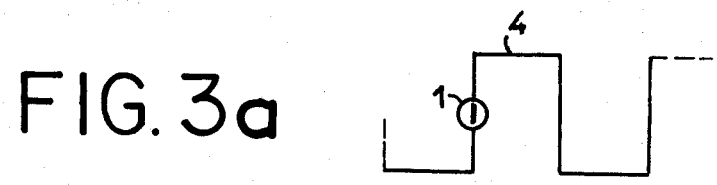
FIGS. 3a, 3b and 3c represent three different positions of a signal receiving head relative to the windings of the conductive circuit.
Figure 4A:
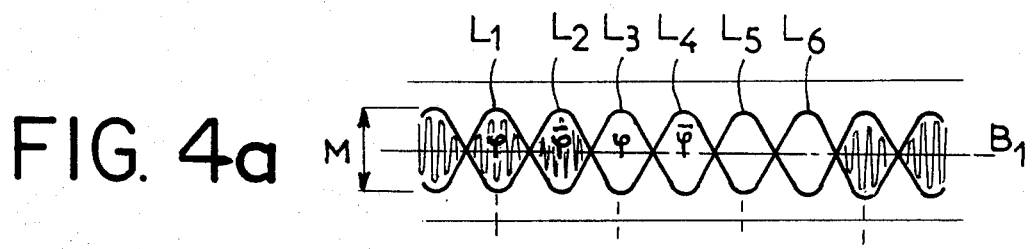
FIGS. 4a, 4b, 4c and 4d illustrate various forms of signals taken at different points in the modulation circuits as a result of signals generated by the signal receiving heads.

Signal $B_1$, represented in FIG. 4a, will now be considered. It will be assumed first that the air gap of head 1 is located opposite one of the parallel elements of transmitter 4, as shown in FIG. 3a. It will be further assumed that the mutual inductance between transmitter 4 and head 1 has a positive maximum first value. With these assumptions, signal $B_1$ exhibits a maximum peak-peak amplitude M and a phase $\phi$, as shown on the lobe $L_1$ of FIG. 4a.

Figure 3B:
Figure 3C:
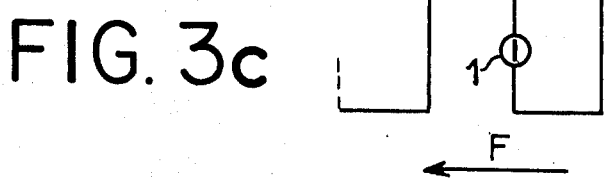

When transmitter 4 is then displaced in the direction of the arrow F and reaches the position shown in FIG. 3b, the air gap of head 1 becomes located an equal distance from two adjacent parallel elements of transmitter 4. Since these two adjacent parallel elements are traversed by currents of equal but opposite direction, the mutual inductance between transmitter 4 and head 1 is cancelled, whereby signal $B_1$ has a null value. When transmitter 4 is displaced again in the direction of arrow F and reaches the position shown in FIG. 3c, the air gap of head 1 is located opposite the next parallel element of transmitter 4. In this position, the mutual inductance has a negative maximum value, equal in magnitude to the aforementioned first value. The consequent signal $B_1$ has a peak-peak amplitude of M, but its phase is inverted and becomes $\bar{\phi} = \phi + \pi$ (FIG. 4a, lobe $L_2$). It is apparent that by identical analysis to that described above, if the transmitter continues its displacement in the same direction, the signal $B_1$ exhibits a predetermined number of lobes $L_1, L_2, L_3$, etc., which have the respective phases $\phi, \bar{\phi}, \phi$, etc., as can be seen in FIG. 4a.

Figure 4B:
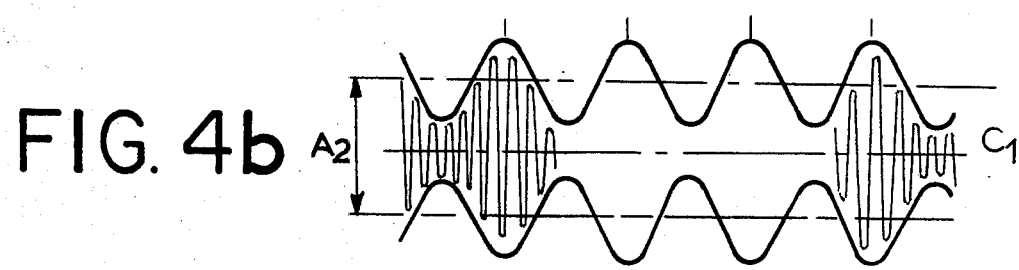
Figure 4C:
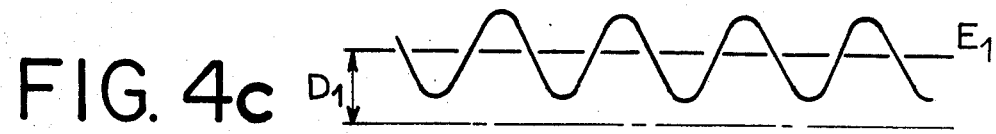
Figure 4D:
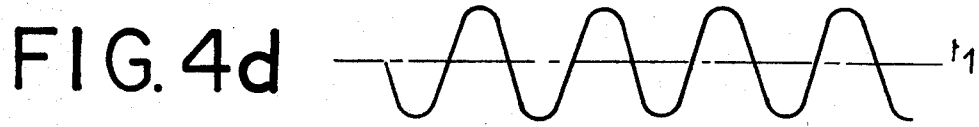

The signal $B_1$ is demodulated by a demodulation circuit 18, FIG. 1. The signals $C_1$, $E_1$, and $t_1$, taken at different points in demodulation circuit 18 are shown in FIG. 4. The signal $B_1$, first amplified, is transmitted to an adder 14, which adds a signal $A_2$ of the same frequency as signal $B_1$ thereto. Signal $A_2$ is in phase with signal $B_1$ for lobes $L_1, L_3, L_5$ etc. and in phase opposition for lobes $L_2, L_4, L_6$ etc. Signal $A_2$ has a peak-peak amplitude shown by the horizontal broken lines of FIG. 4b. The signal $A_2$, satisfying the conditions defined above, is furnished by the combination of generator 5 and phase shifter 13. The signal $C_1$ delivered at the output terminal of adder 14, shown in FIG. 4b, is the algebraic sum of the signals $A_2$ and $B_1$, which algebraic sum results in addition when signals $A_2$ and $B_1$ are in phase (lobes $L_1, L_3, L_5$, etc.), and subtraction when signals $A_2$ and $B_1$ are in phase opposition (lobes $L_2, L_4, L_6$, etc.). The signal $C_1$ is then applied to a rectifier-detector 15. The output signal $E_1$ of rectifier-detector 15 is shown in FIG. 4c. Simultaneously, generator 5 provides a signal $A_1$ of the same frequency and same amplitude as signal $A_2$. Signal $A_1$ is rectified and detected in a rectifier-detector 16, identical to rectifier-detector 15. The output signal $D_1$ of rectifier-detector 16 is shown by dashed lines in FIG. 4c. This signal $D_1$ is subtracted in subtractor 17 from the signal $E_1$. The signal $t_1$ delivered at the output terminal of subtractor 17 is perfectly centered about the zero voltage axis and is the envelope of signal $B_1$. Signal $t_1$ is a substantially sinusoidal function of the position of the transmitter relative to the receiver and, consequently, is a function of the position of the reading and writing heads over the recording tracks of the disc. It is apparent that an identical analysis to that described above in respect to signal $B_1$ can be applied to the signal $B_2$ delivered by head 2 and demodulated by demodulation circuit 19, whereby the corresponding signal $t_2$ is obtained by the output terminal of demodulation circuit 19.

The signals $t_1$ and $t_2$ are in phase quadrature due to the spacing of signal receiving heads 1 and 2 relative to transmitter 4. Signals $t_1$ and $t_2$ are then transformed into logical pulses by appropriate means shown in FIG. 5, these means comprising the threshold circuits 23 and 23a and 24 and 24a, mixing circuits 25 and 25a, a mixer 26, and a one-shot 27 which delivers a logical pulse each time that the reading and writing heads pass over a recording track of the disc. This logical pulse is transmitted to a track difference register 28 whose contents are then decremented by one, thereby constantly representing the difference between the track intended to be reached and the track currently reached. At the start of each track changing operation this difference is communicated to register 28 by a central control 29. Central control 29 determines, in addition, if this difference is positive or negative, and signals the same to the head-bearing carriage to indicate that it must move forward or in reverse.

Through the intermediary of a digital-to-analog converter, not shown, register 28 controls a servo device 32, of known type, which provides for displacing the head-bearing carriage according to a given law of motion in order to bring the reading and writing heads to the immediate proximity of the previously selected recording track. This is a matter of regulating the velocity as a function of the distance remaining to be traveled. This regulation, called "coarse regulation," is terminated when the contents of difference register 28 reaches zero, whereupon the precise positioning of the reading and writing heads above the recording track can then be initiated. This "fine regulation" takes place in a manner analogous to a sinusoidal position function.

According to whether the absolute address of the recording track supplied by central control 29 to track address register 30 is even or odd, the position function $t_1$ or $t_2$ (FIG. 6) is selected.

Figure 6:
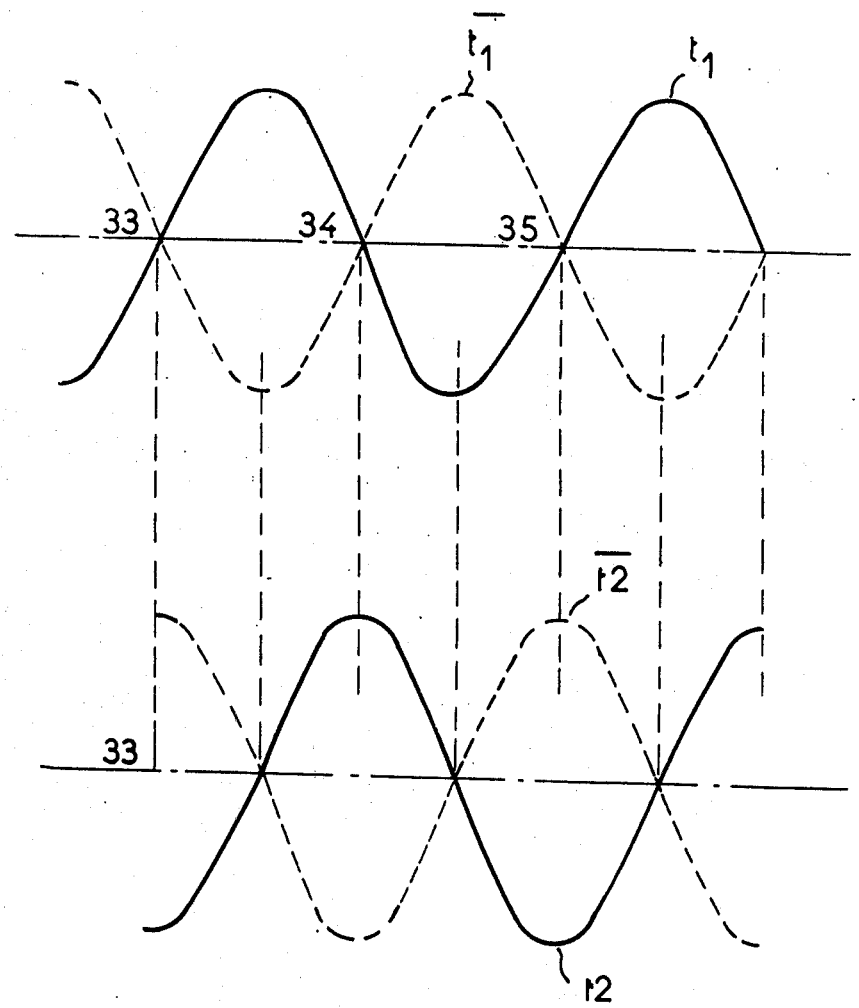
FIG. 6 illustrates the form of this analog voltage.

Assume that the function $t_1$ corresponds to the even tracks and that an even track is selected. Assume further that the first passage through zero 33 (track 0) takes place for a positive slope of the function $t_1$, and that the position regulation so realized is stable. It is apparent, as shown in FIG. 6, that for the second passage through zero 34 (track 1), since the slope of the function $t_1$ is then negative, the regulation will be unstable. Therefore, for the even tracks of the type numbered 2 + 4N, where N is an integer, stable regulation regulates the phase inverse of the function $t_1$.

Figure 5:
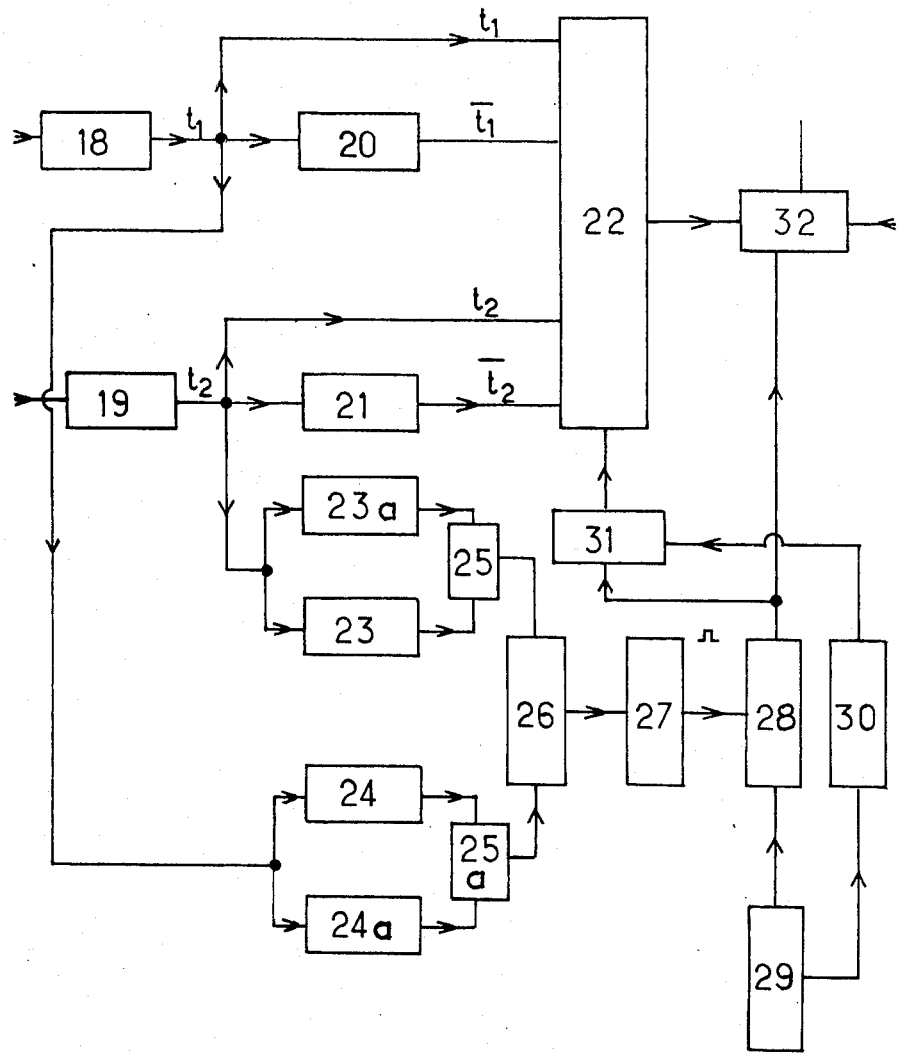
FIG. 5 is a schematic diagram of an arrangement of means for controlling the track difference register and means for delivering an analog voltage providing for the position servoing of the reading and writing heads.

An identical analysis can be applied for the odd tracks. As shown in FIG. 5, the signals $t_1$ and $t_2$ delivered by demodulation circuits 18 and 19 pass through phase inverters 20 and 21. Therefore, the four signals $t_1, \bar{t}_1, t_2, \bar{t}_2$ obtained are transmitted to a multiplexer 22, which is controlled by address register 30 and difference register 28 through the intermediary of an enabling circuit 31. The selection of one of these four voltages is only made when the contents of difference register 28 falls to zero. The signal selected is thereupon transmitted to servo device 32.

What is claimed is:
1. An inductive device for precisely positioning a movable member along a rectilinear path, wherein a motor is provided for driving said movable member along said path, comprising: a plane conductive circuit forming windings, said windings comprising, in turn, a plurality of equispaced parallel elements, means for supplying said plane circuit with a relatively high-frequency electric current, said plane circuit being oriented parallel to said path and attached to said movable member, a plurality of magnetic signal receiving heads each provided with an air gap in a plane parallel to said plane conductive circuit disposed along said plane circuit, the distance between said air gaps measured in a direction parallel to said path being a function of the distance between adjacent ones of said elements, and a control circuit for receiving the signals generated by said heads and generating, a signal for controlling said motor in response to said received signals.

2. The inductive device of claim 1, wherein said movable member comprises a carriage bearing reading and writing heads for an associated magnetic storage disc having a plurality of separate tracks.

3. The inductive device of claim 2, wherein said plane circuit comprises a number of pitches equal to one-half the ratio of the number of separations between the recording tracks of said associated magnetic disc to the number of said signal receiving heads.

4. The inductive device of claim 2 wherein said plane circuit is fixed on a substrate that has a coefficient of thermal expansion identical of that of said associated magnetic disc.

5. The inductive device of claim 2, wherein said control circuit comprises:
   a demodulation circuit for each of said signal receiving heads, said demodulation circuit demodulating the signals generated by the corresponding head,
   means for generating pulses at each passage through zero of the output voltage of said demodulation circuits, each of said passages through zero corresponding to the passage of said reading and writing heads over a recording track of said magnetic disc,
   a track difference register representing the difference between the track selected to be reached and the track currently reached, said register being controlled by said pulses,
   a track address register, and
   means controlled by said address register for delivering an analog error voltage for servoing said reading and writing heads in position over the selected recording track when the contents of said difference register reaches zero.

* * * * *

UNITED STATES PATENT OFFICE
CERTIFICATE OF CORRECTION

Patent No. 3,988,657    Dated October 26, 1976

Inventor(s) Guy Prival et al

It is certified that error appears in the above-identified patent and that said Letters Patent are hereby corrected as shown below:

In the Claims, Claim 2, line 31, "separate" has been changed to -- separated -- .

Signed and Sealed this

Twenty-second Day of March 1977

[SEAL]

Attest:

RUTH C. MASON
Attesting Officer

C. MARSHALL DANN
Commissioner of Patents and Trademarks